(12) United States Patent
Sherkin et al.

(10) Patent No.: US 10,862,831 B2
(45) Date of Patent: Dec. 8, 2020

(54) SYSTEM, METHOD, AND COMPUTER PROGRAM PRODUCT PROVIDING END-TO-END SECURITY OF CENTRALLY ACCESSIBLE GROUP MEMBERSHIP INFORMATION

(71) Applicant: DIGITAL 14 LLC, Abu Dhabi (AE)

(72) Inventors: Alexander Sherkin, Vaughan (CA); Ravi Singh, Toronto (CA); Michael Matovsky, Vaughan (CA)

(73) Assignee: DIGITAL 14 LLC, Abu Dhabi (AE)

( * ) Notice: Subject to any disclaimer, the term of this patent is extended or adjusted under 35 U.S.C. 154(b) by 133 days.

(21) Appl. No.: 15/668,442

(22) Filed: Aug. 3, 2017

(65) Prior Publication Data
US 2019/0044896 A1 Feb. 7, 2019

(51) Int. Cl.
*H04L 12/58* (2006.01)
*H04L 9/08* (2006.01)
(Continued)

(52) U.S. Cl.
CPC ............ *H04L 51/04* (2013.01); *H04L 9/0822* (2013.01); *H04L 9/0836* (2013.01); *H04L 9/0891* (2013.01); *H04L 9/321* (2013.01); *H04L 9/3247* (2013.01); *H04L 51/30* (2013.01); *H04L 63/0428* (2013.01); *H04L 63/065* (2013.01);
(Continued)

(58) Field of Classification Search
CPC ....... H04L 51/04; H04L 9/0822; H04L 51/30; H04L 63/0428; H04L 63/065; H04L 63/0823; H04L 63/123
See application file for complete search history.

(56) References Cited

U.S. PATENT DOCUMENTS 8,230,010 B1 * 7/2012 Hardjono .............. H04L 63/065
709/204
2002/0029337 A1 * 3/2002 Sudia ................... G06Q 20/401
713/176
(Continued)

FOREIGN PATENT DOCUMENTS

EP 1385311 A2 1/2004
WO 2017027438 A1 2/2017

OTHER PUBLICATIONS

NPL Search (Google Scholar) (Year: 2020).*
International Search Report and Written Opinion from PCT Application No. PCT/IB2018/055705, dated Oct. 8, 2018.

*Primary Examiner* — Mahfuzur Rahman
*Assistant Examiner* — Richard W Cruz-Franqui
(74) *Attorney, Agent, or Firm* — Zilka-Kotab, P.C.

(57) ABSTRACT

A system, method, and computer program product are provided for end-to-end security of centrally accessible group membership information. In use, membership information defining a user group in a messaging system is accessed from a central server, where the membership information includes (1) at least one change to members of the user group, and (2) for each change of the at least one change, a digital signature of a user that made the change. Additionally, a verification process on the membership information is performed, including: for each change of the at least one change, verifying the digital signature of the user that made the change. Further, members of the user group are determined, as a result of the verification process, and at least one action is performed in association with the members of the user group.

17 Claims, 9 Drawing Sheets

(51) Int. Cl.
*H04L 9/32* (2006.01)
*H04L 29/06* (2006.01)

(52) U.S. Cl.
CPC ........ *H04L 63/0823* (2013.01); *H04L 63/123* (2013.01)

(56) References Cited

U.S. PATENT DOCUMENTS

| | | | |
|---|---|---|---|
| 2002/0046335 A1* | 4/2002 | Baum-Waidner | G06Q 20/04 713/156 |
| 2003/0149668 A1* | 8/2003 | Lee | G06Q 20/382 705/51 |
| 2003/0182552 A1* | 9/2003 | Tanimoto | H04L 9/3265 713/170 |
| 2004/0093526 A1* | 5/2004 | Hirsch | G06F 21/6218 726/21 |
| 2005/0010442 A1* | 1/2005 | Kragh | G16H 10/60 705/2 |
| 2007/0143829 A1* | 6/2007 | Hinton | H04L 63/0884 726/5 |
| 2007/0226505 A1* | 9/2007 | Brickell | G06F 21/57 713/176 |
| 2008/0052388 A1* | 2/2008 | Korkishko | H04L 69/40 709/223 |
| 2008/0155080 A1* | 6/2008 | Marlow | H04M 3/5322 709/223 |
| 2009/0328170 A1* | 12/2009 | Williams | H04L 63/20 726/7 |
| 2012/0137121 A1* | 5/2012 | Sherkin | H04L 63/0428 713/150 |
| 2013/0205376 A1 | 8/2013 | Narasimha et al. | |
| 2014/0082365 A1* | 3/2014 | Everhart | H04L 63/065 713/175 |
| 2014/0156757 A1* | 6/2014 | Zhang | H04L 12/1822 709/204 |
| 2016/0182487 A1* | 6/2016 | Zhu | H04L 63/105 726/9 |
| 2016/0292680 A1* | 10/2016 | Wilson, Jr. | G06Q 20/40 |
| 2016/0352526 A1 | 12/2016 | Adler et al. | |
| 2017/0048217 A1* | 2/2017 | Biggs | H04L 63/123 |
| 2017/0060595 A1* | 3/2017 | Keidar | H04L 9/30 |
| 2017/0272250 A1* | 9/2017 | Kaliski, Jr. | H04L 9/3265 |
| 2018/0041460 A1* | 2/2018 | Das | H04L 51/16 |
| 2018/0227275 A1* | 8/2018 | Russinovich | H04L 9/3265 |
| 2018/0309567 A1* | 10/2018 | Wooden | H04L 9/3239 |
| 2019/0044896 A1* | 2/2019 | Sherkin | H04L 51/30 |

\* cited by examiner

SYSTEM, METHOD, AND COMPUTER PROGRAM PRODUCT PROVIDING END-TO-END SECURITY OF CENTRALLY ACCESSIBLE GROUP MEMBERSHIP INFORMATION

FIELD OF THE INVENTION

The present invention relates to group membership in a messaging system, and more particularly to securing group membership information in a messaging system.

BACKGROUND

Some messaging systems employ user groups which allow users in a group to send and receive messages as a group. For example, one user in the group may send a message to all other users in the group, or a selected subset of the other users in the group. Maintaining a list of group members securely is important because once a group is created, users make assumptions about which users are part of the group and which are not. If a malicious user M can silently add themselves to a user group, this user M can now quietly eavesdrop on the group's messages without other members realizing that user M is now part of the group, and user M can also receive all messages exchanged in this group. Hence, it is important that group membership information is protected.

Generally, end-to-end (peer-to-peer) security is preferred to a security model that relies on a trusted central server. This is because, otherwise, the central server has to be trusted not to tamper with data stored on the central server, and further, where the central server is malicious, there is a risk that user group membership data integrity will be compromised. Thus, one conventionally used approach to protect group membership information is to maintain the information securely on group member devices. However, this approach poses engineering challenges.

For example, if user A registers a new device D1 (in addition to an existing device D0), then device D1 should be able to download information for user groups that user A is a part of. Device D1 can download this information from device D0 or other group members. However, what if device D0 is lost or it is offline? How does device D1 know which users to ask for group membership information if device D1 does not know which users are part of the group? Device D1 can ask all users if they are part of the group, but this approach is very inefficient and may not be secure.

There is thus a need for addressing these and/or other issues associated with the prior art.

SUMMARY

A system, method, and computer program product are provided for end-to-end security of centrally accessible group membership information. In use, membership information defining a user group in a messaging system is accessed from a central server, where the membership information includes (1) at least one change to members of the user group, and (2) for each change of the at least one change, a digital signature of a user that made the change. Additionally, a verification process on the membership information is performed, including: for each change of the at least one change, verifying the digital signature of the user that made the change. Further, members of the user group are determined, as a result of the verification process, and at least one action is performed in association with the members of the user group.

DETAILED DESCRIPTION

Figure 1:
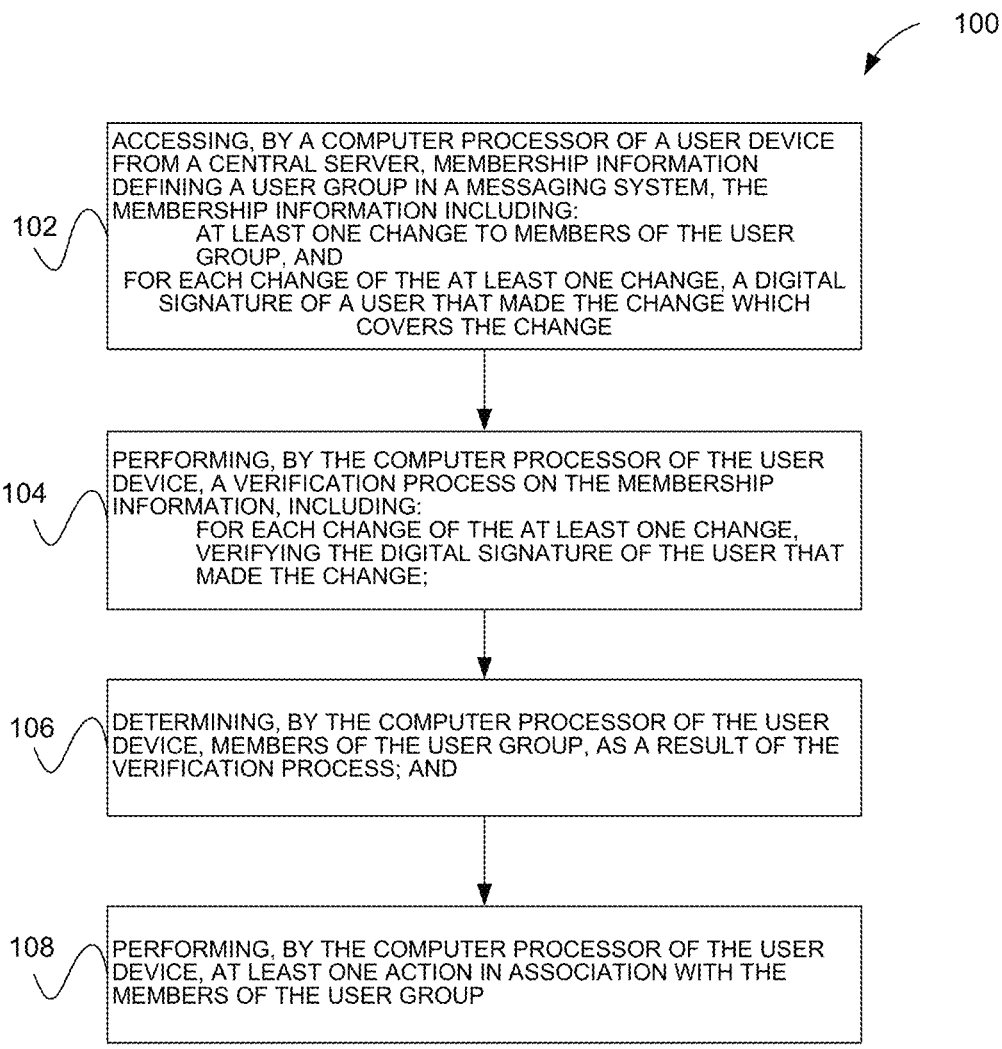
FIG. 1 shows a method providing end-to-end security of centrally accessible group membership information, in accordance with one embodiment.

FIG. 1 shows a method 100 providing end-to-end security of centrally accessible group membership information, in accordance with one embodiment. The method is described as operations performed by a computer processor of a user device. The computer processor may be any type of processor of any type of user device configured to perform the operations, such as those described below with reference to FIG. 9. Further, the method 100 may be performed by every user device when accessing the centrally stored group membership information. Further, as mentioned below, the group membership information is made centrally accessible by a central server. It should be noted that the user device may be in communication with the central server (i.e. for accessing the group membership information) over any network capable of providing a communication channel therebetween (e.g. see FIG. 10 for a possible environment including the user device and central server).

As shown in operation 102, membership information defining a user group in a messaging system is accessed from a central server, where the membership information includes (1) at least one change to members of the user group, and (2) for each change of the at least one change, a digital signature of a user that made the change which covers the change. For example, the membership information may be stored in a database of the central server. Of course, the central server may also store other membership information defining other user groups in the messaging system.

In the context of the present description, the messaging system may be any hardware and/or software configured to enable the communication of messages between users. Just by way of example, the messaging system may be a peer-to-peer messaging system. To this end, a format of the messages (e.g. short message service messages (SMS), email messages, etc.) may depend the particular messaging system employed.

As noted above, the messaging system is configured to provide a user group. The user group is a defined set of users that are members of the user group and that are authorized to communicate with each other through the messaging system. For example, only the members of the user group may be allowed to send/receive communications to/from one another using the messaging system. As another example, only the members of the user group may be allowed to access and contribute to a group conversation thread or any other type of shared digital content using the messaging system.

The user group may be created within the messaging system by storing initial membership information for the user group within the central server. This initial membership information may include, for example, a unique identifier of the user group, a name for the user group, and an identifier of a creator of the user group. The initial membership information may also indicate the creator of the user group as an administrator for the user group.

Once the user group is created, members of the user group can be changed over time. Each change is indicated in the membership information and can include an addition of a new member to the user group and/or removal of an existing member from the user group. For example, following creation of the user group, the creator of the user group can add one or more new members to the user group. In one embodiment, new members may be added by creating, within the messaging system, an invitation for each of the new members, and sending the invitation to those new members for acceptance thereof. Members that accept the invitation may be provided with a private/public key pair with a certificate issued by a trusted certificate authority.

Depending on policies for the user group, existing members of the group can then make further changes to the user group over time, including adding even more new members to the group, removing existing members from the user group, and/or assigning/removing a member of the user group as an administrator. Just by way of example, one policy may allow any member of the group to add a new member to the group. As another example, another policy may only allow administrators of the group to remove existing members from the group, with the exception that members of the group may be allowed to remove themselves from the user group. As yet another example, a further policy may only allow administrators of the group to assign/remove a member of the user group as an administrator. The policies for the user group may be defined within the central server (e.g. during creation of the user group), and may be configured by the creator of the user group or by default.

The policies are enforced through end-to-end protection of the membership information. In general, the end-to-end protection of the membership information is provided through use of digital signatures given to the members of the user group, where each change made to the membership information must be digitally signed by the member making the change and where other members can verify the digital signature before accepting the change. To this end, the membership information may be centrally stored, but not necessarily centrally protected since end-to-end protection is employed. Details on this end-to-end protection are provided below.

As noted above in operation 102, the membership information that is accessed (e.g. retrieved from the central server) includes (1) at least one change to members of the user group, and (2) for each change, a digital signature of a user that made the change which covers the change. Of course, additional parts of the membership information may also be accessed, but in any case at least a history of changes made to the members of the user group and the associated digital signatures are accessed.

Additionally, as shown in operation 104, a verification process on the membership information is performed, including: for each change of the at least one change, verifying the digital signature of the user that made the change. Thus, once the membership information is accessed, the verification process is performed. It should be noted that the membership information may be accessed by the user device when a member of the user group using the user device requests to create and send a group message, or even periodically as defined by the messaging system.

The verification process includes verifying each change made to members of the user group by verifying the digital signature of the user that made the change. Verifying the digital signature of the user may optionally also include verifying a certificate associated with the digital signature. After verifying the digital signature of the user that made the change, the verification process may further include verifying that the change is allowed by the policies (e.g. verifying that the user is assigned a role with permission required for making the change). When the digital signature is verified, the corresponding change may be accepted (i.e. made to the user group, etc.). When the digital signature is not verified, the corresponding change may be rejected (i.e. ignored, etc.).

In one embodiment, the method 100 may include generating, from the membership information, a tree showing paths of changes made to the user group. For example, the creator of the user group may be at the root of the tree, and each new member added by the creator may be included in a node that begins a branch of the tree. When one of those new members added by the creator makes a further change to the user group, then that change may be a new node that extends from the branch of the tree corresponding to that member. Thus, each change may be included in a new node that extends from the node having the member that made the change.

Further to this embodiment, the verification process may be performed according to the paths in the tree. Thus, for any particular change in the tree where the verification fails (i.e. the digital signature cannot be verified), then the verification of further changes extending in the tree from that particular change may also automatically fail. Similarly, for any particular change in the tree where the verification passes (i.e. the digital signature is verified), then the verification process may be performed on a next change extending in the tree from that particular change.

Then, as shown in operation 106, members of the user group are determined, as a result of the verification process. For example, for each change corresponding to a digital signature that is verified during the verification process, the change may be accepted (i.e. the result of the verification process may be making the accepted change to the user group). As another example, for each change corresponding to a digital signature that is not verified during the verification process, the change may be rejected (i.e. the result of the verification process may be ignoring the rejected change such that it is not made to the user group).

Thus, in one embodiment, where the change is an addition of a new member to the user group and the digital signature for that change has been verified, then the new member may be accepted as a member of the user group. However, where the change is an addition of a new member to the user group and the digital signature for that change fails to be verified, then the new member may be rejected as a member of the user group.

In another embodiment, where the change is a removal of an existing member from the user group and the digital signature for that change has been verified, then the change may be accepted and the existing member may be determined to be removed from the user group. However, where the change is a removal of an existing member from the user group and the digital signature for that change fails to be verified, then the change may be rejected and the existing member may be determined to still be a member of the user group.

Still yet, as shown in operation 108, at least one action is performed in association with the members of the user group. Accordingly, once the members of the user group are determined from the verification process, then an action (i.e. operation) in association with those members may be performed. This may ensure that the action is performed in association with a most current, and valid, set of the members of the user group.

In one embodiment, the action may include sending, through the messaging system, a message to one or more of the members of the user group. For example, a user of the user device may create a message and select from the members of the user group which members that the message is to be sent to. In another embodiment, the action may include making at least one additional change to the user group (e.g. adding a new member to the user group or removing an existing member from the user group), and providing a digital signature with the at least one additional change. This additional change may then be verified by any other member of the group using the method 100 described above.

To this end, the method 100 provides end-to-end protection of centrally accessible membership information defining a user group within a messaging system. Optionally, the membership information may be visible to any user devices (i.e. capable of accessing the central server), however the membership information authenticity and data integrity may be achieved through the end-to-end protection process described above. In this way, and by way of example only, a malicious user who has write access to the central server cannot change the members of the user group or otherwise make any changes to the user group. However, storing the membership information centrally may allow a user to download the membership information when registering a new device (in addition to an existing device or replacing an old device).

It also is an option for the central server to provide further security for the membership information. Just by way of example, the central server may employ an access control list for controlling the access to the membership information in operation 102. This may make the membership information inaccessible to non-members of the user group, as an alternative to the visibility mentioned above.

As another example, the central server may prohibit a rollback of the membership information to a prior state. As still yet another example, the central server may prohibit members of the user group from removing from the membership information any previously made changes to the user group (i.e. a history of changes made to the user group).

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
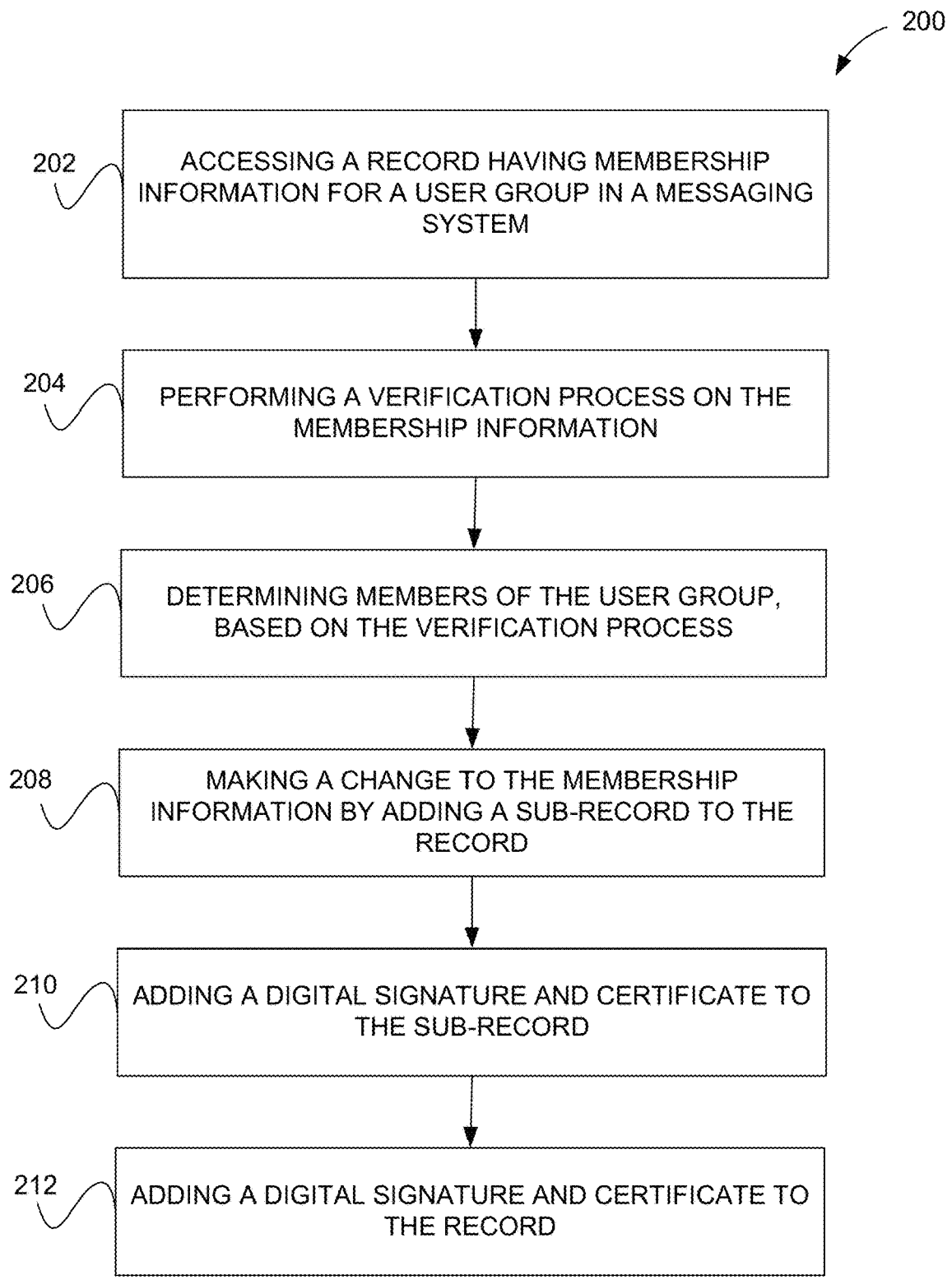
FIG. 2 shows a method for making a change to cryptographically verified group membership information, in accordance with another embodiment.

FIG. 2 shows a method 200 for making a change to cryptographically verified group membership information, in accordance with another embodiment. As an option, the method 200 may be carried out in the context of the method 100 of FIG. 1 (e.g. by the computer processor mentioned with respect to FIG. 1). Of course, however, the method 200 may be carried out in any desired context. It should also be noted that the aforementioned definitions may apply during the present description.

As shown in operation 202, a record having membership information for a user group in a messaging system is accessed. For example, the messaging system may store in database membership information for different user groups. Membership information for each different user group may be stored in a separate record of the database. Thus, membership information for a particular user group may be accessed by accessing the centrally stored record that includes that membership information.

Additionally, as shown in operation 204, a verification process is performed on the membership information. The verification process may verify each change in a history of changes made to the user group. Further, in operation 206, and as a result of the verification process, members of the user group are determined.

Still yet, in operation 208, a change to the membership information is made by adding a sub-record to the record. In one embodiment where the change includes inviting a new member to the user group, a new invitation sub-record may be added to the record. In another embodiment where the change includes removing an existing member from the group, a new revocation sub-record may be added to the record. Thus, the record may reflect a tree of changes made to the user group, through the addition of new invitation and new revocation sub-records.

In operation 210, a digital signature and a certificate are added to the sub-record. The digital signature and certificate may be specific to the user of the user device making the change in operation 208, and may be used by other members of the user group that subsequently access the record to verify the user that made the change to the membership information. Thus, the digital signature added in operation 210 may cover just the change made to the record (i.e. the addition of the sub-record).

Then, in operation 212, a digital signature and a certificate are added to the record. Again, the digital signature and certificate may be specific to the user of the user device making the change in operation 208, but in this case may be used by other members of the user group that subsequently access the record to verify a current state of the record. Thus, the digital signature added in operation 212 may be an overall digital signature that covers the entire record. This may allow the members of the user group to ensure that the last change made to the record was made by a member of the user group. Accordingly, the membership information in the record may generally include a digital signature of a user that made a most recent change to the membership information, in which case the verification process (as described in operation 204) will also include verifying the digital signature of the user that made the most recent change to the membership information.

Figure 3:
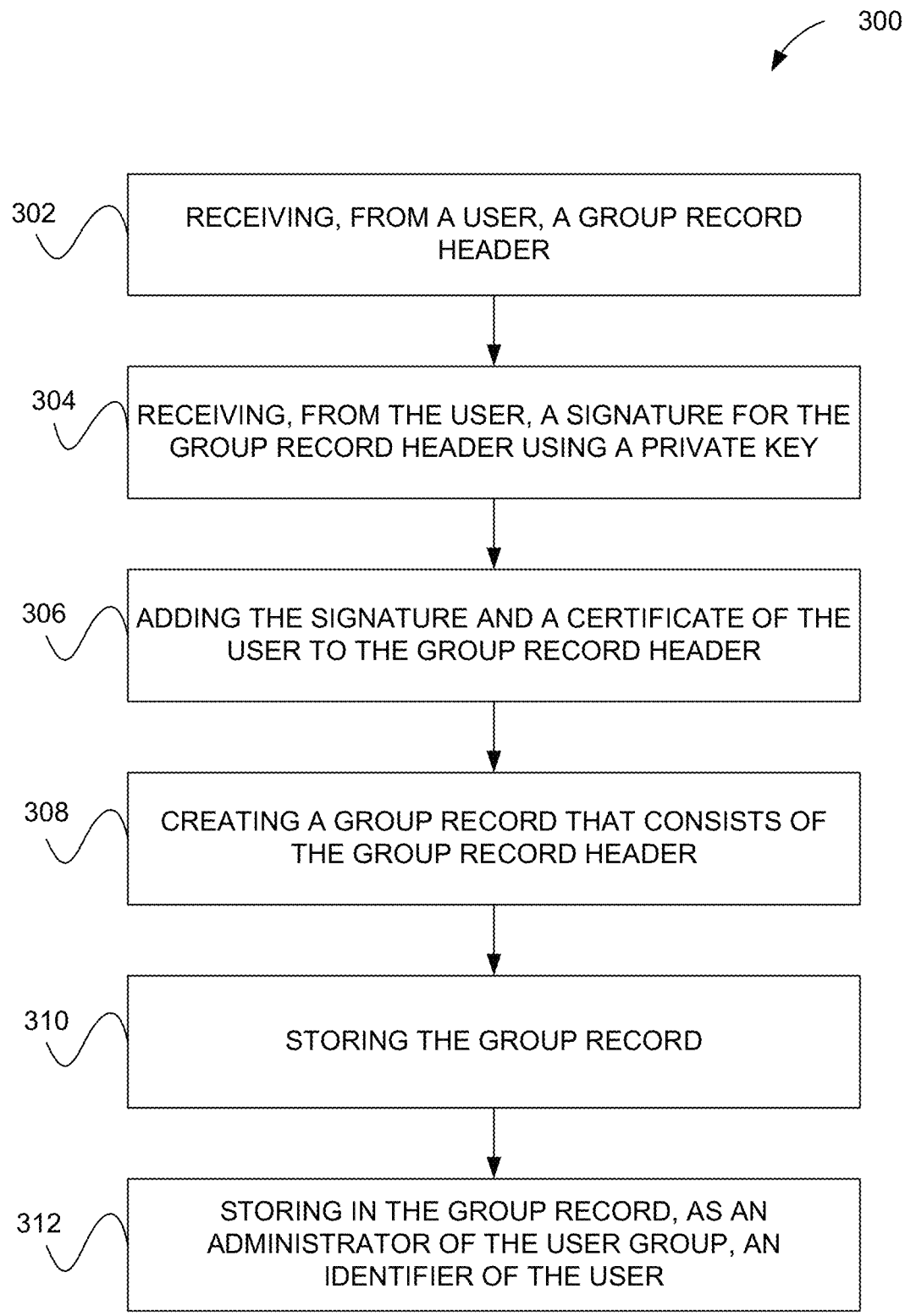
FIG. 3 shows a method for creating a user group in a messaging system, in accordance with yet another embodiment.

FIG. 3 shows a method 300 for creating a user group in a messaging system, in accordance with yet another embodiment. As an option, the method 300 may be carried out in the context of the previous figures (e.g. by the computer processor mentioned with respect to FIG. 1). Of course, however, the method 300 may be carried out in any desired context. For example, the method 300 may be carried out responsive to a user providing input through graphical user interface (GUI). In this example, the user may request to add a new user group to the messaging system via the GUI, and then further GUIs may be provided allow the user to configure the new user group. Again, it should also be noted that the aforementioned definitions may apply during the present description.

As shown in operation 302, a group record header is received from a user. The group record header may be a name for a user group the user is creating. The group record header may also include an identifier of the user, an identifier of the user group, a version, and a timestamp.

In operation 304, a signature for the group record header is received from the user using a private key of the user. The private key may be part of a key pair with the public key in the pair being held by the messaging system. Thus, the signature may be used to verify the user.

In operation 306, the signature and a certificate of the user are added to the group record header. A group record having the group record header is then created in operation 308. In one embodiment, the group record may only consist of the group record header at this point in the method 300.

The group record is then stored, as shown in operation 310. This may be performed responsive to the user requesting to publish the new group record to the central server. Further, in operation 312, an identifier of the user is stored in the group record for identifying the user as an administrator for the user group.

Figure 4:
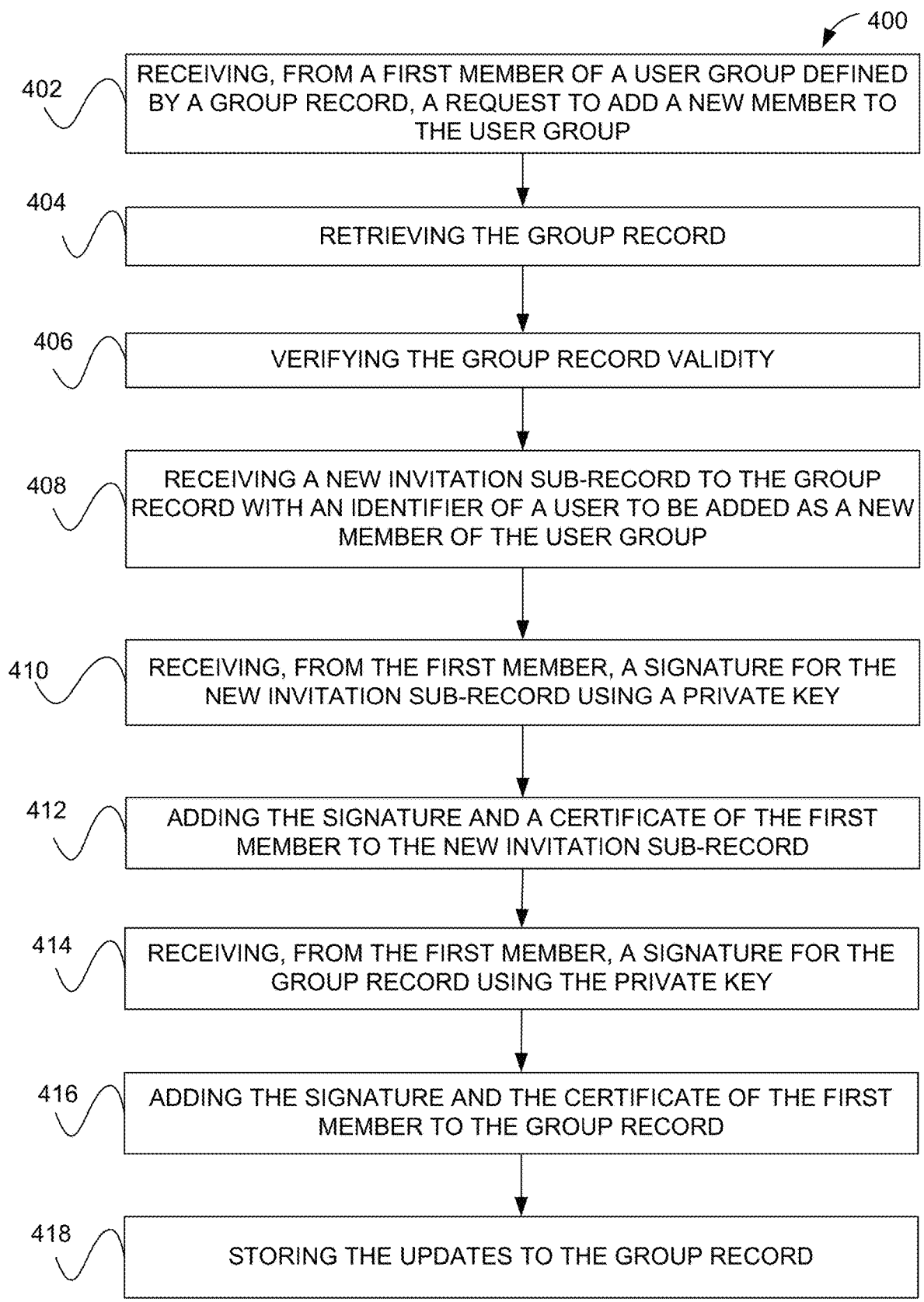
FIG. 4 shows a method for adding a new member to a user group in a messaging system, in accordance with still yet another embodiment.

FIG. 4 shows a method 400 for adding a new member to a user group in a messaging system, in accordance with still yet another embodiment. As an option, the method 400 may be carried out in the context of the previous figures (e.g. by the computer processor mentioned with respect to FIG. 1). Of course, however, the method 400 may be carried out in any desired context. For example, the method 400 may be carried out responsive to a user providing input through graphical user interface (GUI). In this example, the user may request to add a new member to a user group in the messaging system via the GUI, and then further GUIs may be provided allow the user to configure the new member. Again, it should also be noted that the aforementioned definitions may apply during the present description.

As shown in operation 402, a request to add a new member to a user group defined by a group record is received from a first member of the user group. The request may include an identifier of the group record or a name of the group record. The group record is then retrieved (e.g. from a database at the central server), as shown in operation 404.

Additionally, the group record validity is verified, as shown in operation 406. One embodiment of the verification process is described in more detail below with reference to FIG. 7. Of course, other processes may also be used to verify that the group record is valid.

Further, as shown in operation 408, a new invitation sub-record to the group record is received with an identifier of a user to be added as a new member of the user group. The new invitation sub-record may be automatically generated in response to the first member providing the identifier of the user for being added as a new member of the group. The invitation sub-record may include the identifier of the user group, a timestamp, an identifier of the first member that has requested to add the new user to the user group, and the identifier of the new user requested to be added as a member of the group.

In operation 410, a signature for the new invitation sub-record is received from the first member using a private key of the first member. Then, as shown in operation 412, the signature and a certificate of the first member are added to the new invitation sub-record. Similarly, in operations 414-416, a signature for the group record is received from the first member using the private key of the first member and the signature and the certificate of the first member are added to the group record. The updates to the group record are then stored (e.g. in the database at the central server), as shown in operation 418.

Figure 5:
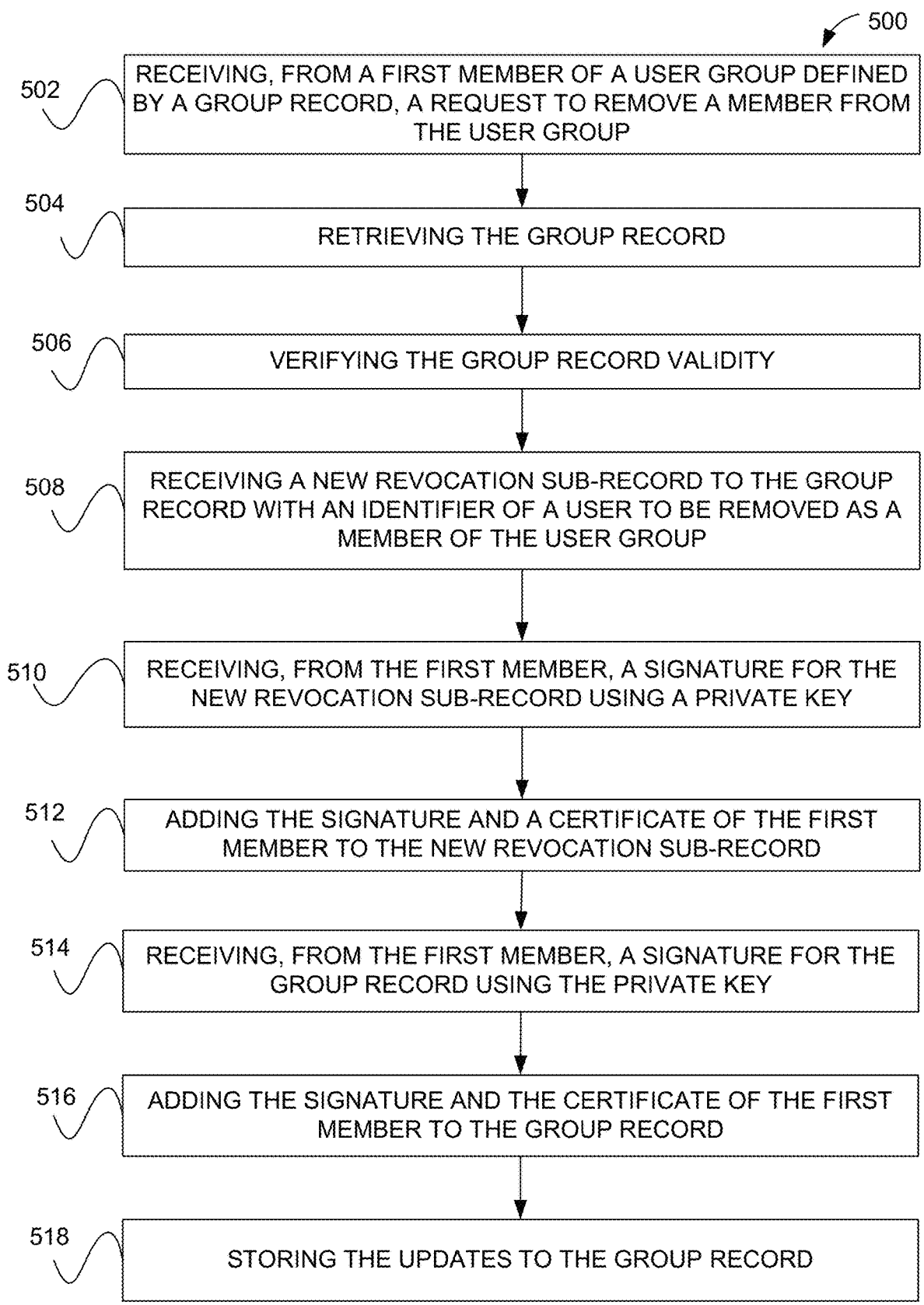
FIG. 5 shows a method for removing an existing member from a user group in a messaging system, in accordance with another embodiment.

FIG. 5 shows a method 500 for removing an existing member from a user group in a messaging system, in accordance with another embodiment. As an option, the method 500 may be carried out in the context of the previous figures (e.g. by the computer processor mentioned with respect to FIG. 1). Of course, however, the method 500 may be carried out in any desired context. For example, the method 500 may be carried out responsive to a user providing input through graphical user interface (GUI). In this example, the user may request to remove an existing member from a user group in the messaging system via the GUI. Again, it should also be noted that the aforementioned definitions may apply during the present description.

As shown in operation 502, a request to remove an existing member from a user group defined by a group record is received from a first member of the user group. The request may include an identifier of the group record or a name of the group record. The group record is then retrieved (e.g. from a database at the central server), as shown in operation 504.

Additionally, the group record validity is verified, as shown in operation 506. One embodiment of the verification process is described in more detail below with reference to FIG. 7. Of course, other processes may also be used to verify that the group record is valid.

Further, as shown in operation 508, a new revocation sub-record to the group record is received with an identifier of a user to be removed as a new member of the user group. The new revocation sub-record may be automatically generated in response to the first member providing the identifier of the user for being removed as the member of the user group. The revocation sub-record may include the identifier of the user group, a timestamp, an identifier of the first member that has requested to remove the user from the user group, and the identifier of the user requested to be removed as a member of the user group.

In operation 510, a signature for the new revocation sub-record is received from the first member using a private key of the first member. Then, as shown in operation 512, the signature and a certificate of the first member are added to the new revocation sub-record. Similarly, in operations 514-516, a signature for the group record is received from the first member using the private key of the first member and the signature and the certificate of the first member are added to the group record. The updates to the group record are then stored (e.g. in the database at the central server), as shown in operation 518.

Figure 6:
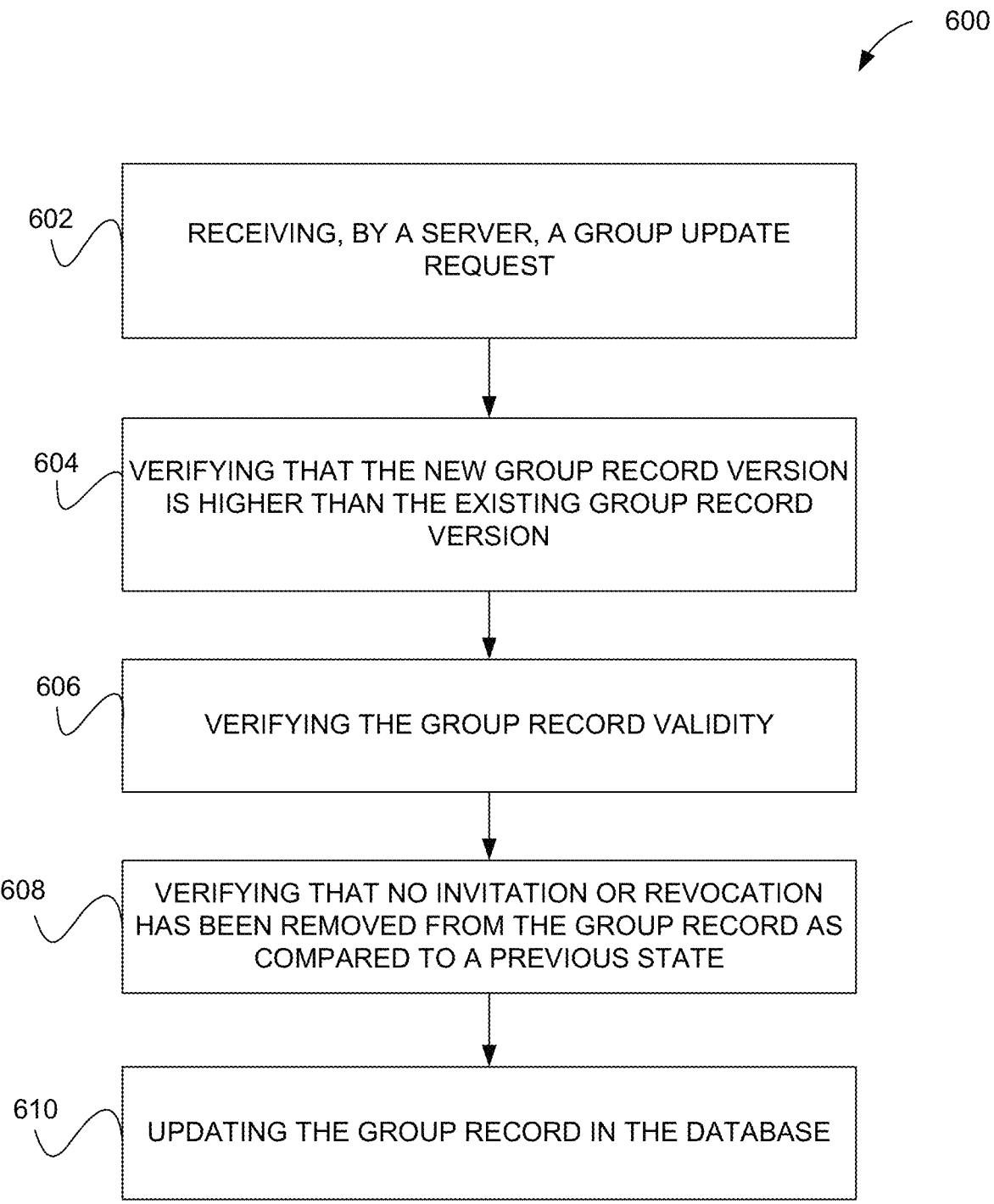
FIG. 6 shows a method for updating a user group in a messaging system, in accordance with another embodiment.

FIG. 6 shows a method 600 for updating a user group in a messaging system, in accordance with another embodiment. As an option, the method 600 may be carried out in the context of the previous figures (e.g. by the computer processor mentioned with respect to FIG. 1). Of course, however, the method 600 may be carried out in any desired context. For example, the method 600 may be carried out responsive to operations 418 and 518 described above, or responsive to any other update being made to a group record (e.g. at the central server). Again, it should also be noted that the aforementioned definitions may apply during the present description.

As shown in operation 602, a group update request is received by a central server. For example, the group update request may be a request to store an update to a group record in the database of the central server, such as described in operations 418 and 518 above. Thus, the group update request may be a request to add a new invitation sub-record or new revocation sub-record to a group record, or any other update being requested to be made to a group record.

Additionally, in operation 604, it is verified that the new group record version is higher than the existing group record version. In one embodiment, the new group record version may be indicated by a timestamp on the update being requested (e.g. on the new invitation sub-record or new revocation sub-record), and may be verified against a timestamp on the stored group record. In any case it is verified that the new group record version is a later version than the stored version of the group record.

Further, the group record validity is verified, as shown in operation 606. One embodiment of the verification process is described in more detail below with reference to FIG. 7. Of course, other processes may also be used to verify that the group record is valid.

In operation 608, it is verified that no invitations or revocations have been removed from the group record as compared to a previous state. The group record is then updated in the database at the central server, as shown in operation 610. Thus, the method 600 may serve to perform various verifications before updating the group record in the database of the central server. If any of the verifications fail, then the method 600 may terminate (not shown), and optionally a notification of the failure may be provided to a user that initiated the update.

Figure 7:
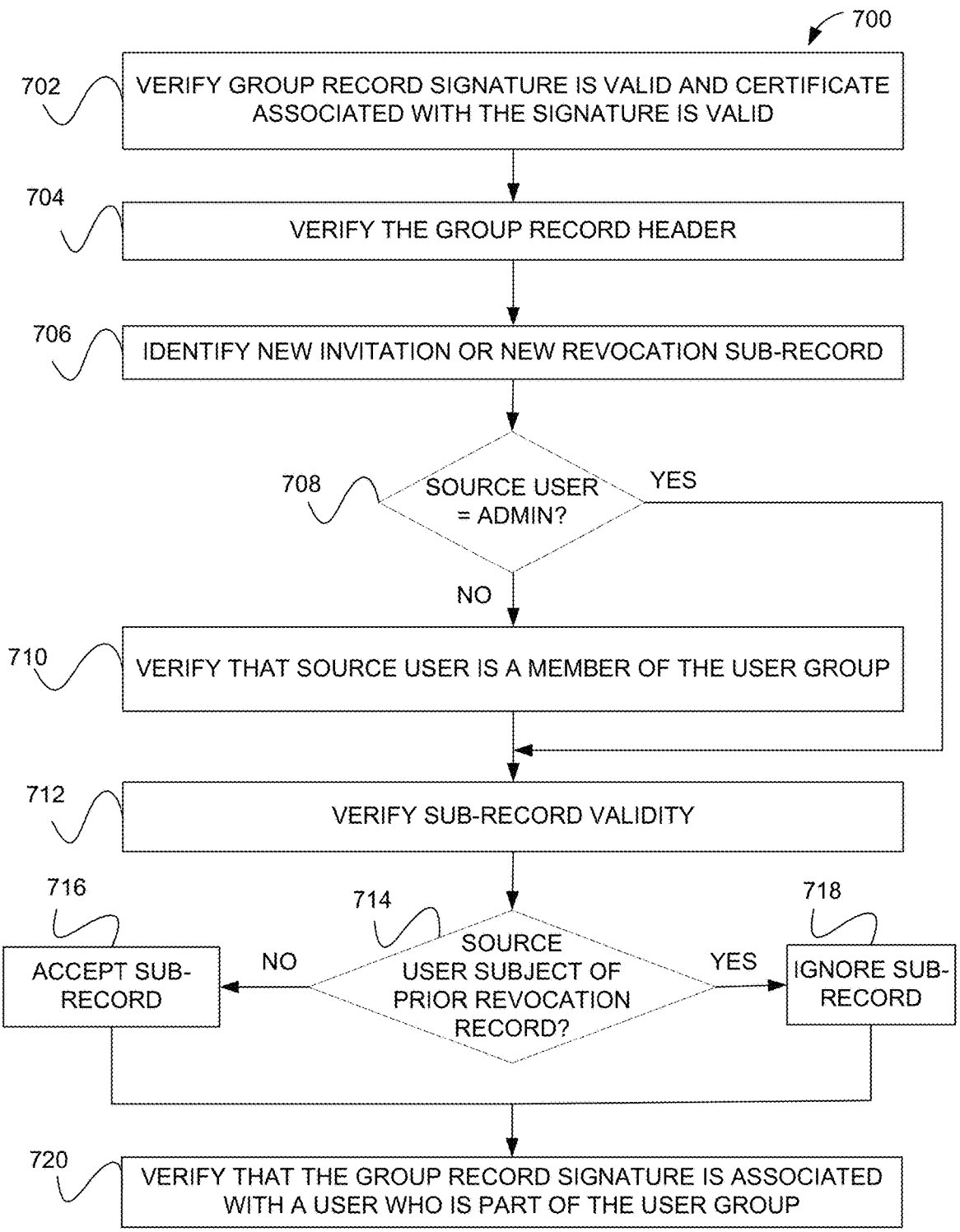
FIG. 7 shows a method for validating a user group in a messaging system, in accordance with yet another embodiment

FIG. 7 shows a method 700 for validating a user group in a messaging system, in accordance with yet another embodiment. As an option, the method 700 may be carried out in the context of the previous figures (e.g. by the computer processor mentioned with respect to FIG. 1). Of course, however, the method 700 may be carried out in any desired context. For example, the method 700 may be performed each time a user retrieves a group record from the central server for the purpose of making an update thereto. Thus, the method 700 may be performed before allowing the user to access or update the record. Again, it should also be noted that the aforementioned definitions may apply during the present description.

As shown in operation 702, it is verified that the signature and the certificate associated with the group record is valid. This may involve verifying that the certificate is from a trusted source. Additionally, as shown in operation 704, the group record header is verified. For example, this may be performed by verifying the group record header signature and the certificate associated with the signature (e.g. that the certificate is from a trusted source), as well as by verifying that the certificate is associated with a user identified as an administrator within the group record.

In operation 706, a new invitation sub-record or a new revocation sub-record of the group record is identified. Further, it is determined in decision 708 whether the user that digitally signed the new invitation sub-record or the new revocation sub-record identified in operation 706 is the administrator of the user group. This decision may be made by verifying whether the certificate associated with the invitation sub-record or a new revocation sub-record is a certificate associated with an identifier of the administrator of the user group.

When it is determined in decision 708 that the user that digitally signed the new invitation sub-record or the new revocation sub-record is not the administrator of the user group, it is verified in operation 710 that the user is a member of the user group. This may similarly be accomplished by verifying whether the certificate associated with the new invitation sub-record or a new revocation sub-record is a certificate associated with an identifier of a verified member of the user group. The method 700 then proceeds to operation 712. If the verification in operation 710 fails, then the method 700 may terminate, and optionally a notification message may be provided to a user for which the method 700 was initiated.

When it is determined in decision 708 that the user that digitally signed the new invitation sub-record or the new revocation sub-record is the administrator of the user group, the method 700 then proceeds to operation 712. In operation 712, validity of the new invitation sub-record or a new revocation sub-record is verified. This may be performed by verifying the signature of the sub-record and the certificate associated with the signature, as well as that the certificate is associated with a same user as the certificate identified for the group record from decision 708.

Additionally, in decision 714, it is determined whether the user is a subject of a prior revocation sub-record for the group record. This may be accomplished by determining if a revocation sub-record exists that removes the user from the user group and that has a timestamp that is earlier than the timestamp of the new invitation sub-record or a new revocation sub-record identified in operation 706.

When it is determined in decision 714 that the user is not a subject of a prior revocation sub-record for the group record, then the new invitation sub-record or a new revocation sub-record identified in operation 706 is accepted (see operation 716). The method 700 then proceeds to operation 720. When it is determined in decision 714 that the user is a subject of a prior revocation sub-record for the group record, then the new invitation sub-record or a new revocation sub-record identified in operation 706 is ignored (see operation 718).

Optionally, further verifications may be required before the new invitation sub-record or a new revocation sub-record identified in operation 706 is ignored. These verifications may include verifying the signature on the prior revocation sub-record and verifying the certificate associated with the signature, identifying the user associated with the certificate and confirming that the user is allowed to remove the source user (e.g. that the user is the administrator for the user group or that the user is removing himself). Thus, a user that requests a member to be added to the group or removed from the group must be verified to be a current member before the request is approved.

The method 700 then proceeds to operation 720. In operation 720, it is verified that the signature on the group record is associated with a user that is currently a member of the group. If this verification fails, then a result of the method 700 may be a failure (i.e. the validity of the group record may fail to be verified).

By securely making membership information for a user group in a messaging system centrally accessible to user devices using the techniques described with respect to the various figures above, it may be ensured that a rogue user cannot add themselves to a user group that they are not part of even if this rogue user controls the central server. It may also be ensured that a rogue user (who is not part of the user group) cannot modify the group membership in such a way that such group membership state never existed in the past. Further, it may be ensured that a rogue user who is part of the user group may not remove a user other than themselves (assuming this is not allowed per the policies for the user group) when this rogue user is in collusion with the central server. Still yet, it may be ensured that a rogue user cannot replace a valid group record with an older group record (that was valid at some point in the past).

Moreover, if a same user is added to the user group and removed from the user group repeatedly, the group record could in one embodiment be filled with invitation sub-records and revocation sub-records for the same user. This could be optimized (e.g. during the verification process) by removing a revocation sub-record that removes a particular user when a later invitation sub-record for that particular user added to the group record.

Figure 8:
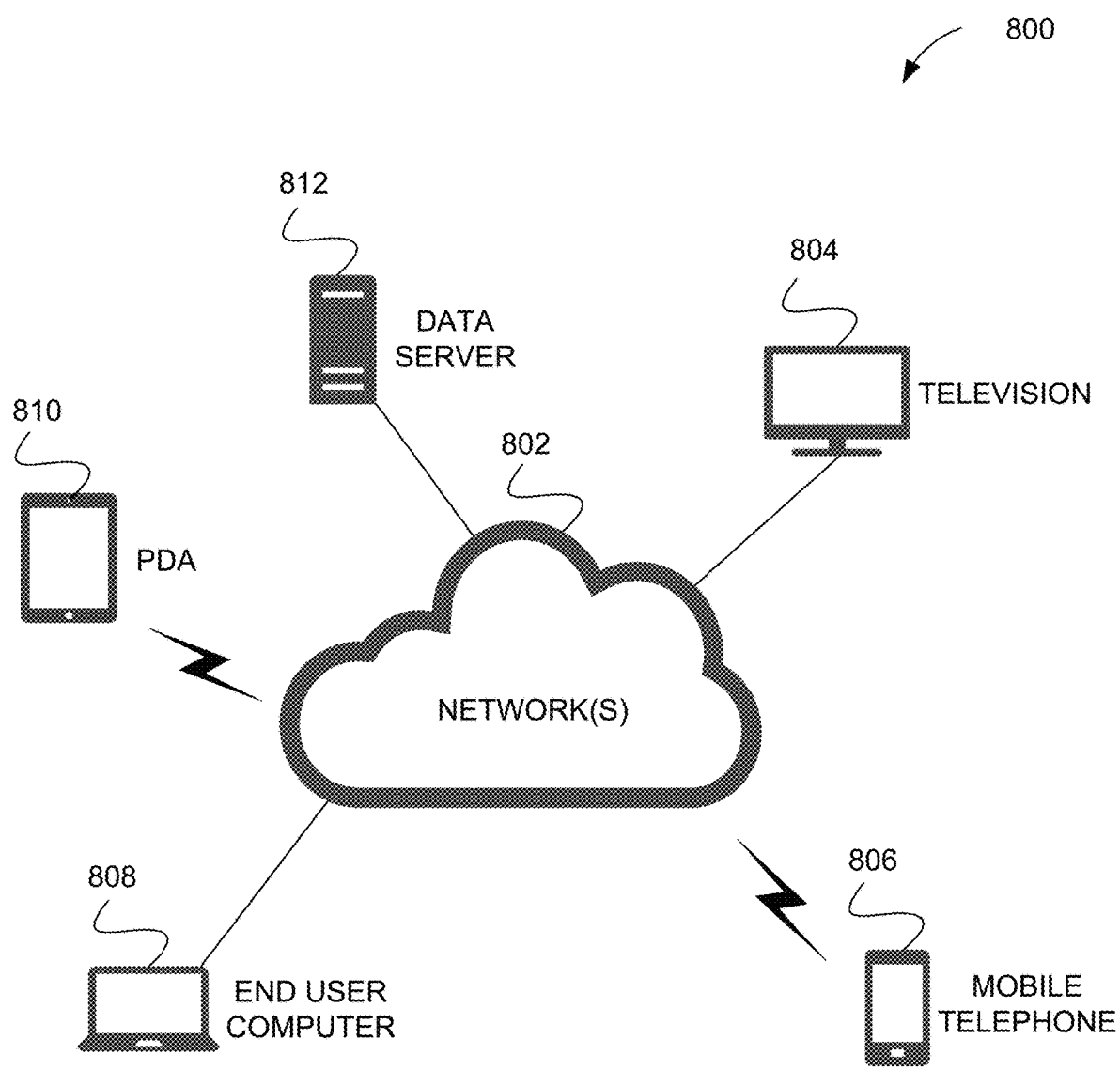
FIG. 8 illustrates a network architecture, in accordance with one embodiment.

FIG. 8 illustrates a network architecture 800, in accordance with one embodiment. As shown, at least one network 802 is provided. In various embodiments, any one or more components/features set forth during the description of any previous figure(s) may be implemented in connection with any one or more of the components of the at least one network 802.

In the context of the present network architecture 800, the network 802 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 802 may be provided.

Coupled to the network 802 is a plurality of devices. For example, a server computer 812 and an end user computer 808 may be coupled to the network 802 for communication purposes. Such end user computer 808 may include a desktop computer, lap-top computer, and/or any other type of logic. Still yet, various other devices may be coupled to the network 802 including a personal digital assistant (PDA) device 810, a mobile phone device 806, a television 804, etc.

Figure 9:
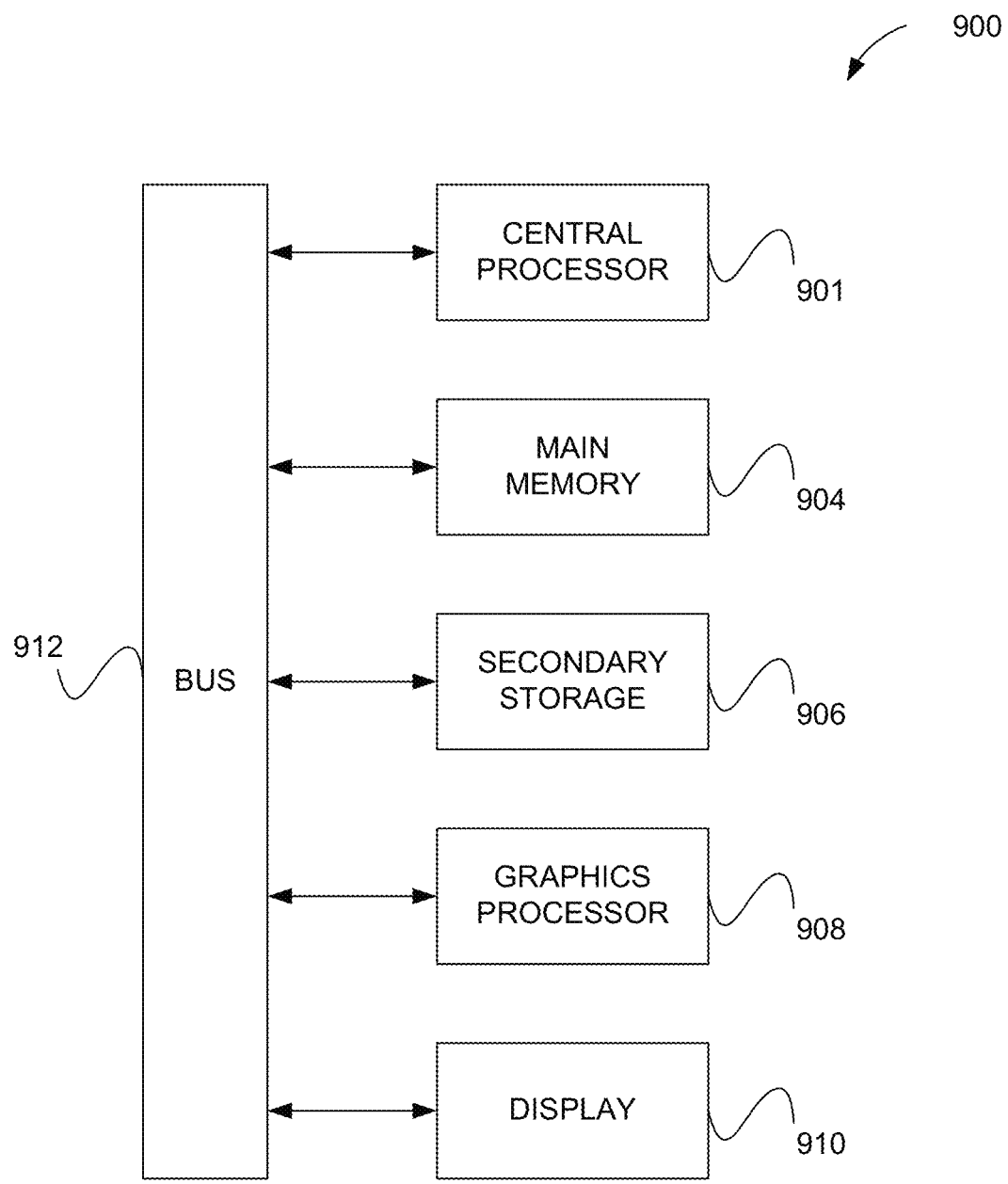
FIG. 9 illustrates an exemplary system, in accordance with one embodiment.

FIG. 9 illustrates an exemplary system 900, in accordance with one embodiment. As an option, the system 900 may be implemented in the context of any of the devices of the network architecture 800 of FIG. 8. However, it is to be appreciated that the system 900 may be implemented in any desired environment.

As shown, a system 900 is provided including at least one central processor 902 which is connected to a bus 912. The system 900 also includes main memory 904 [e.g., hard disk drive, solid state drive, random access memory (RAM), etc.]. The system 900 also includes a graphics processor 908 and a display 910.

The system 900 may also include a secondary storage 906. The secondary storage 906 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 904, the secondary storage 906, and/or any other memory, for that matter. Such computer programs, when executed, enable the system 900 to perform various functions (as set forth above, for example). Memory 904, secondary storage 906 and/or any other storage are possible examples of non-transitory computer-readable media.

In one embodiment, means in the form of the processor 902 (and/or different means corresponding to different components thereof) executes instructions in the memory 904 or in the secondary storage 906 to: access, by a computer processor of a user device from a central server, membership information defining a user group in a messaging system, the membership information including: (1) at least one change to members of the user group, and (2) for each change of the at least one change, a digital signature of a user that made the change; perform, by the computer processor of the user device, a verification process on the membership information, including: for each change of the at least one change, verifying the digital signature of the user that made the change; determine, by the computer processor of the user device, members of the user group, as a result of the verification process; and perform, by the computer processor of the user device, at least one action in association with the members of the user group.

Optionally, in any of the preceding embodiments, the computer processor of the user device accesses the membership information from the central server via a network.

Optionally, in any of the preceding embodiments, the at least one change to the members of the user group includes an addition of a new member to the user group.

Optionally, in any of the preceding embodiments, the at least one change to the members of the user group includes a removal of an existing member from the user group.

Optionally, in any of the preceding embodiments, a tree showing paths of changes made to the user group is generated by the computer processor of the user device from the membership information. As a further option, the verification process is performed according to the paths in the tree.

Optionally, in any of the preceding embodiments, performing, by the computer processor of the user device, the verification process on the membership information includes: for each change of the at least one change: (1) verifying the digital signature of the user that made the change, (2) accepting the change when the digital signature is verified, and (3) rejecting the change when the digital signature is not verified. As a further option, determining, by the computer processor of the user device, the members of the user group, as a result of the verification process includes: making the accepted changes to the user group, and ignoring the rejected changes.

Optionally, in any of the preceding embodiments, verifying the digital signature of the user that made the change further includes verifying a certificate associated with the digital signature.

Optionally, in any of the preceding embodiments, the verification process performed on the membership information further includes: after verifying the digital signature of the user that made the change, verifying that the user is assigned a role with permission required for making the change. As a further option, only an administrator is permitted to remove an existing member from the user group. As another option, any member of the user group is permitted to add a new member to the user group.

Optionally, in any of the preceding embodiments, performing, by the computer processor of the user device, the at least one action in association with the members of the user group includes: sending, through the messaging system, a message to one or more of the members of the user group.

Optionally, in any of the preceding embodiments, performing, by the computer processor of the user device, the at least one action in association with the members of the user group includes: making at least one additional change to the user group, and providing a digital signature with the at least one additional change. As a further option, the at least one additional change to the user group includes at least one of: adding a new member to the user group, and removing an existing member from the user group.

Optionally, in any of the preceding embodiments, the membership information further includes a digital signature of a user that made a most recent change in the at least one change, and wherein the verification process on the membership information further includes: verifying the digital signature of the user that made the most recent change in the at least one change.

Optionally, in any of the preceding embodiments, the central server provides further security for the membership information. As a further option, the further security provided by the central server includes: prohibiting a rollback of the membership information to a prior state, and prohibiting members of the user group from removing from the membership information any previously made changes to the user group.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method, comprising:
receiving, by a computer processor of a user device, a request from a user of the user device to send a group message to members of a user group in a messaging system;
responsive to the request from the user to send the group message to the members of the user group, accessing, by the computer processor of the user device from a central server, membership information defining the user group, the membership information indicating:
a plurality of prior changes to the members of the user group and represented as a tree of changes with a branch for each change sequence, and
for each change of the plurality of prior changes, a digital signature of a source user that made the change covering the change;
responsive to accessing the membership information, performing, by the computer processor of the user device, a verification process on the membership information according to paths of the tree, including:
for each change in the plurality of prior changes covered by a digital signature of a user that is not a verified member of the group, rejecting the change and all changes extending in the tree from the change,
where remaining changes of the plurality of prior changes covered by a digital signature of a user that is a verified member of the group are accepted;
determining, by the computer processor of the user device, current members of the user group, as a result of the verification process; and
sending, by the computer processor, the group message to the current members of the user group.

2. The method of claim 1, wherein the computer processor of the user device accesses the membership information from the central server via a network.

3. The method of claim 1, wherein the plurality of prior changes to the members of the user group includes an addition of a new member to the user group.

4. The method of claim 1, wherein the plurality of prior changes to the members of the user group includes a removal of an existing member from the user group.

5. The method of claim 1, wherein determining, by the computer processor of the user device, the current members of the user group, as a result of the verification process includes:
making the accepted changes to the user group, and
ignoring the rejected changes.

6. The method of claim 1, wherein the verification process for each change in the plurality of prior changes further includes verifying a certificate associated with the digital signature covering the change.

7. The method of claim 1, wherein accepting the remaining changes further includes:
accepting each change in the remaining changes when the source user is assigned a role with permission required for making the change.

8. The method of claim 7, wherein only an administrator is permitted to remove an existing member from the user group.

9. The method of claim 7, wherein any member of the user group is permitted to add a new member to the user group.

10. The method of claim 1, wherein performing, by the computer processor of the user device, the requested action in association with the current members of the user group includes:
sending, through the messaging system, the group message to the current members of the user group.

11. The method of claim 1, wherein performing, by the computer processor of the user device, the requested action in association with the current members of the user group includes:
making the at least one new change to the current members of the user group, and
providing a digital signature with the at least one new change made to the current members of the user group.

12. The method of claim 11, wherein the at least one new change to the current members of the user group includes at least one of:
adding a new member to the user group, or
removing an existing member from the user group.

13. The method of claim 1, wherein the membership information further includes an overall digital signature of a user that made a most recent change in the at least one change, wherein the overall digital signature covers an entire group membership record storing the membership information, and wherein the verification process on the membership information further includes:
verifying the overall digital signature of the user that made the most recent change in the plurality of prior changes.

14. The method of claim 1, wherein the central server provides further security for the membership information.

15. The method of claim 14, wherein the further security provided by the central server includes:
prohibiting a rollback of the membership information to a prior state, and
prohibiting members of the user group from removing from the membership information any previously made changes to the user group.

16. A non-transitory computer readable medium storing computer code executable by a processor to perform a method comprising:
receiving, by a computer processor of a user device, a request from a user of the user device to send a group message to members of a user group in a messaging system;
responsive to the request from the user to send the group message to the members of the user group, accessing, by the computer processor of the user device from a central server, membership information defining the user group, the membership information indicating:

a plurality of prior changes to the members of the user group and represented as a tree of changes with a branch for each change sequence, and for each change of the plurality of prior changes, a digital signature of a source user that made the change covering the change;

responsive to accessing the membership information, performing, by the computer processor of the user device, a verification process on the membership information according to paths of the tree, including:

for each change in the plurality of prior changes covered by a digital signature of a user that is not a verified member of the group, rejecting the change and all changes extending in the tree from the change, where remaining changes of the plurality of prior changes covered by a digital signature of a user that is a verified member of the group are accepted;

determining, by the computer processor of the user device, current members of the user group, as a result of the verification process; and sending, by the computer processor, the group message to the current members of the user group.

17. An apparatus, comprising:

a computer processor of a user device for:

receiving a request from a user of the user device to send a group message to members of a user group in a messaging system;

responsive to the request from the user to send the group message to the members of the user group, accessing, from a central server, membership information defining the user group, the membership information indicating:

a plurality of prior changes to the members of the user group and represented as a tree of changes with a branch for each change sequence, and for each change of the plurality of prior changes, a digital signature of a source user that made the change covering the change;

responsive to accessing the membership information, performing a verification process on the membership information according to paths of the tree, including:

for each change in the plurality of prior changes covered by a digital signature of a user that is not a verified member of the group, rejecting the change and all changes extending in the tree from the change, where remaining changes of the plurality of prior changes covered by a digital signature of a user that is a verified member of the group are accepted;

determining current members of the user group, as a result of the verification process; and sending the group message to the current members of the user group.

\* \* \* \* \*